Jan. 8, 1946.  R. B. COTTRELL  2,392,725

SNUBBER

Filed Sept. 4, 1942

INVENTOR.
Robert B. Cottrell
BY
Atty

Patented Jan. 8, 1946

2,392,725

UNITED STATES PATENT OFFICE 2,392,725

SNUBBER

Robert B. Cottrell, Chicago, Ill., assignor to American Steel Foundries, Chicago, Ill., a corporation of New Jersey Application September 4, 1942, Serial No. 457,287

9 Claims. (Cl. 267—9)

This invention relates to friction absorbing devices and more particularly to a device known as a snubber which, when associated with a bolster supporting spring group of a railway car truck, serves to dampen oscillations of the springs constituting said group, thus preventing deleterious, harmonious oscillations of said springs.

An object of my invention is to design a snubber as above described which may take the place of a single coil spring in a bolster supporting spring group.

A different object of my invention is to design a snubber comprising relatively few parts and capable of long life in service, said snubber comprehending a structure comprising a hexagonal friction housing and a pair of friction shoes supported within a single coil spring, said shoes being received within said housing and urged into engagement with internal V-shaped friction surfaces thereon by means of a plurality of vertically aligned horizontally disposed compression springs.

A further object of my invention is to design a snubber comprising means for simply, removably and movably interlocking the bottom follower with its associated friction shoes, said means comprising a T-section projection on said bottom follower, opposite sides of the horizontal web of said T section being recessed in the respective friction shoes.

Figure 2:
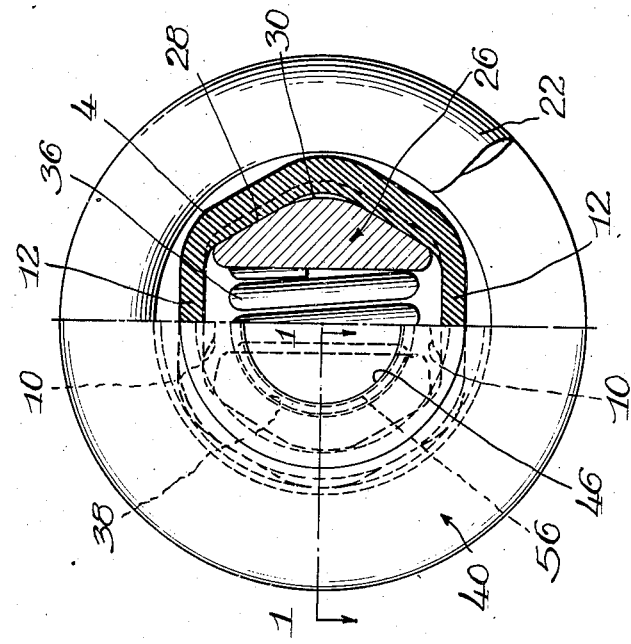
Figure 1:
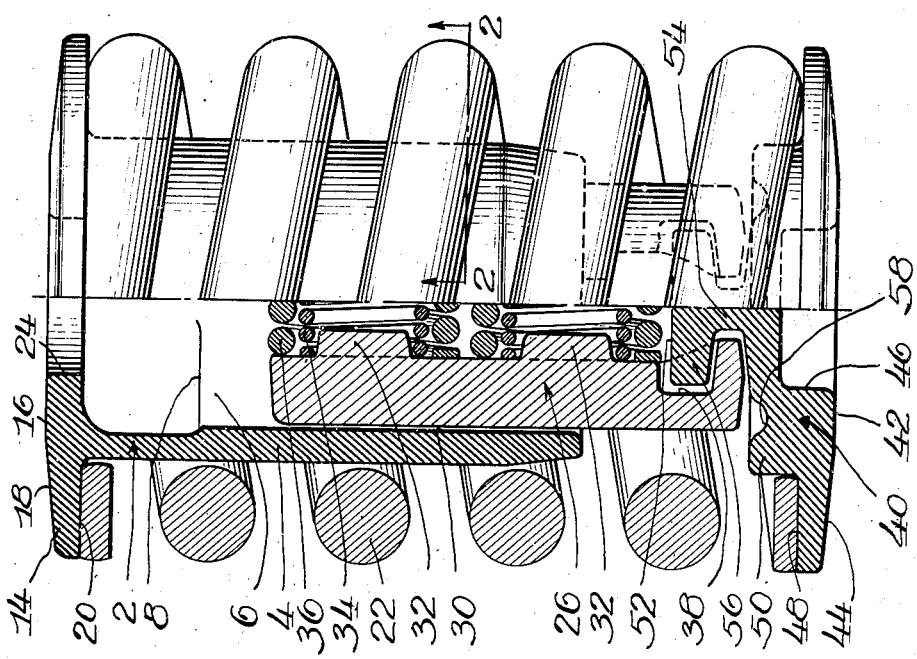

In the drawing, Figure 1 is a side view of my novel snubber, the right half thereof being an elevational view and the left half thereof being a sectional view taken in the plane indicated by the line 1—1 of Figure 2; and Figure 2 is a bottom view of the structure shown in Figure 1, the left half thereof being a plan view and the right half thereof being a sectional view taken in the plane indicated by the line 2—2 of Figure 1.

Describing my invention in detail, the top follower, generally designated 2, comprises the hexagonal friction housing 4 having internal V-shaped friction surfaces 6, 6 at opposite sides thereof, each of the surfaces 6, 6 being relieved as at 8 (Figure 1) in order to prevent the wearing of a shoulder on the associated friction shoe as will be clearly apparent to those skilled in the art. It will be apparent from a consideration of Figure 2 that the portion of the housing defining each friction surface 6 is of relatively thick section and said housing is provided with internal projections 10, 10 in order to prevent assembly of the friction shoes in engagement with the relatively thin sections of the friction housing indicated at 12, 12 (Figure 2).

The top follower 2 also comprises the annular base 14 affording a seat as at 16 for the upper end of the snubber against an associated supported member, said base being tapered at 18 in order to accommodate a rocking movement of the snubber on the seat 16; and said base 14 also provides a seat as at 20 for the coiled compression or load spring 22 sleeved over the friction housing 4 and the associated friction shoes and engaged with the bottom follower in a manner hereinafter more fully described. The base 14 of the top follower 2 also comprises a round opening 24 centrally thereof, said opening being formed and arranged for the reception of positioning means on the associated supported member as will be clearly apparent to those skilled in the art.

Friction shoes generally designated 26, 26 are positioned in complementary engagement as at 28 (Figure 2) with the associated V-shaped friction surfaces 6, 6 on the housing 4, the apex of each V-shaped surface 6 being afforded a clearance at 30 from the associated friction shoe in order to accommodate wearing in therebetween as will be clearly apparent.

Each friction shoe 26 comprises on the inner surface thereof a plurality of bosses 32, 32, each of said bosses projecting into a pair of inner and outer coil springs 34 and 36 respectively, said coil springs being under compression between the shoes at opposite sides of the snubber and being operative to urge said shoes into frictional engagement as at 28 with the associated friction surfaces 6, 6 on the friction housing. The lower end of each friction shoe 26 is formed with an arcuate recess 38 formed and arranged for interlocking engagement with the bottom follower in a manner hereinafter more fully described.

The bottom follower, generally designated 40 is of generally cylindrical form and affords a seat as at 42 for the lower end of the snubber, said follower being tapered as at 44 on the bottom surface thereof in order to afford a rocking movement on the seat 42; and said bottom follower also comprises a substantially cylindrical recess 46 in the bottom thereof adapted for the reception of positioning means on an associated supporting member in the usual manner. It may be noted that the load spring 22 is seated at 48 on the bottom follower, said follower comprising a projection 50 received within said spring and serving to position said follower with respect thereto.

On the upper surface of the bottom follower 40 is formed a projection 52 of T section, said projection comprising the vertical web 54 and the horizontal web 56, said horizontal web being of substantially round contour in plan view as seen in Figure 2 and being thus formed and arranged for convenient reception within the arcuate recesses 38, 38 on the friction shoes 26, 26 whereby said shoes and said bottom follower are interlocked. It may be noted that the projection 50 is formed with an annular groove or recess 58 in order to afford clearance for the associated friction shoes during a rocking movement of the snubber as above described.

It will be apparent from a consideration of Figure 1 that the engagement between the bottom follower and the friction shoes is sufficiently loose to permit the shoes to be moved outwardly with respect to the friction housing as wear takes place therebetween. It will be further understood that although I have herein described the follower 2 as a top follower and the follower 40 as a bottom follower, the snubber may, if desired, be inverted with the follower 40 being a top follower and the follower 2 being a bottom follower.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a friction absorbing device, a top follower comprising a friction housing having oppositely disposed interval V-shaped friction surfaces, a base on said housing affording a rocking seat on the top surface thereof for an associated supported member and affording a seat on the bottom thereof for a coil spring sleeved over said housing, friction shoes having friction faces in complementary engagement with said surfaces, resilient means urging said shoes into said engagement, and a bottom follower rockingly engaged with said shoes and comprising a T section projection, opposite sides of the horizontal web of said T section being recessed in respective shoes, said bottom follower affording a seat for the opposite end of said spring and affording a rocking seat on the bottom surface thereof for said device upon an associated supporting member, said bottom follower having an annular recess affording clearance for said shoes during rocking movement thereof with respect to said bottom follower, said recess being disposed on the upper surface of said bottom follower beneath the friction faces of said shoes.

2. In a friction absorbing device, a housing, shoes therein comprising friction faces, resilient means compressed between said shoes for urging said faces into frictional engagement with said housing, a follower comprising a projection extending toward said housing and having a T-section member on the top thereof, opposite sides of the horizontal web of said T section being recessed within and loosely interlocked with corresponding ends of said shoes, a spring sleeved over said housing and said projection and seated against abutment means on said housing and said follower respectively, said shoes having on said ends respectively V-shaped surfaces formed and arranged for rockable abutment with a bearing surface on said projection on the compression stroke of the device, and a recess in said bearing surface aligned longitudinally of the device with said faces, said recess being constructed and arranged to afford clearance for the edges of said V-shaped surfaces remote from the longitudinal axis of the device during rocking movement of said V-shaped surfaces on said bearing surface.

3. In a friction absorbing device, a housing, shoes therein comprising friction faces, resilient means operatively associated with said shoes for urging said faces into engagement with said housing, a follower loosely interlocked with corresponding ends of said shoes, a spring sleeved over said housing and seated against abutment means thereon and against said follower, a projection on said follower received within said spring for positioning the same, said projection extending toward said housing and having a T-section member on the top thereof, opposite sides of the horizontal web of said T section being recessed within respective shoes, said corresponding ends having V-shaped abutment faces formed and arranged for rockable engagement with an adjacent abutment surface on said projection during compression of said device, said abutment surface being recessed in alignment with said friction faces to afford clearance for said corresponding ends of said shoes during rocking movement between said abutment faces and said abutment surface.

4. In a friction absorbing device, a housing comprising internal friction surfaces, friction shoes having faces in engagement therewith, resilient means urging said shoes into said engagement, a bottom follower engaged with said shoes and comprising a T section projection, opposite sides of the horizontal web of said T section being recessed in respective shoes, each shoe having on the bottom thereof a V-shaped surface for rocking abutment with an adjacent surface of the bottom follower on the compression stroke of the device, resilient means engaged at opposite ends thereof with said housing and said follower, and a recess in the upper side of said follower beneath said faces affording clearance for said shoes during rocking movement thereof with respect to said follower, the faces on said shoes being substantially vertical and extending from end to end thereof.

5. In a friction absorbing device, a top follower comprising a friction housing having internal friction surfaces, a base on said housing affording a seat on the bottom thereof for a coil spring sleeved over said housing, friction shoes within said housing, each shoe being substantially triangular in cross section with the hypotenuse thereof affording spring-positioning means and with the other two sides thereof providing friction faces in complementary engagement with said surfaces, a plurality of coil springs between said shoes and positioned by said means for operatively urging said shoes into said engagement, and a bottom follower rockingly engaged with said shoes and comprising a T-section member, opposite sides of the horizontal web of said T-section being recessed within respective shoes, said bottom follower affording a seat for the opposite end of said spring, and said bottom follower having a recess on the upper surface thereof beneath the friction faces of said shoes, said recess being constructed and arranged to afford clearance for said shoes during rocking movement thereof with respect to said bottom follower.

6. In a friction absorbing device, a top follower comprising a friction housing having internal friction surfaces, a base on said housing affording a seat on the bottom thereof for a spring sleeved over said housing, friction shoes within said housing, each shoe being substantially triangular in cross section with the hypotenuse thereof affording positioning means for associated resilient means and with the other two sides thereof providing friction faces in complementary engagement with said surfaces, resilient means between said shoes and engaging said positioning means, said resilient means urging said shoes into said engagement, and a bottom follower rockingly engaged with said shoes and comprising a projection received within said spring and adapted for positioning the same relative to said bottom follower, said spring being seated against abutment means on said bottom follower, a T-section member on said bottom follower extending upwardly from said projection, opposite sides of the horizontal web of said T-section being recessed within respective shoes, and a recess in the upper surface of said projection beneath the friction faces of said shoes, said recess being constructed and arranged to afford clearance for said shoes during rocking movement thereof with respect to said bottom follower.

7. In a friction absorbing device, a housing comprising internal friction surfaces, friction shoes within said housing, each shoe being substantially triangular in cross section with the hypotenuse thereof affording positioning means for associated resilient means and with the other two sides thereof providing faces in engagement with said surfaces, resilient means between said shoes and engaging said positioning means, said resilient means urging said shoes into said engagement, a bottom follower engaged with said shoes and comprising a T-section projection, opposite sides of the horizontal web of said T-section being recessed in respective shoes, each shoe having on the bottom thereof a V-shaped surface for rocking abutment with an adjacent surface of the bottom follower on the compression stroke of the device, resilient means engaged at opposite ends thereof with said housing and said follwer, and a recess in the upper side of said follower beneath said faces affording clearance for said shoes during rocking movement thereof with respect to said follower.

8. In a friction absorbing device, a housing comprising internal friction surfaces, friction shoes having faces in engagement therewith, resilient means urging said shoes into said engagement, a bottom follower engaged with said shoes and comprising an upwardly extending projection with a T-section member on the top thereof, opposite sides of the horizontal web of said T-section being recessed within respective shoes, a spring sleeved over said housing and said projection and seated against abutment means on said housing and said bottom follower respectively, each shoe having on the bottom thereof a V-shaped surface for rocking abutment with the upper surface of said projection on the compression stroke of the device, and a recess in said upper surface beneath said faces affording clearance for said shoes during rocking movement thereof with respect to said upper surface.

9. In a friction absorbing device, a housing, shoes therein each comprising a triangular block-like member with the hypotenuse thereof having raised studs affording spring-positioning means and with the other two sides thereof providing friction faces, a plurality of coil springs having opposite ends thereof positioned by respective studs on said shoes and operatively urging said faces against said housing, a follower loosely interlocked with said shoes adjacent corresponding ends thereof, a spring sleeved over said housing and bearing against abutment means on said follower and housing respectively, said corresponding ends having abutment faces formed and arranged for rockable engagement with an abutment surface on said follower during relative lateral displacement between said follower and housing on the closure stroke of the device, said abutment surface being recessed in alignment with said friction faces to afford clearance for said corresponding ends during rocking movement between said abutment faces and said surface.

ROBERT B. COTTRELL.